United States Patent
Kagami et al.

(10) Patent No.: US 7,916,430 B2
(45) Date of Patent: Mar. 29, 2011

(54) THIN-FILM MAGNETIC HEAD AND MANUFACTURING METHOD THEREOF

(75) Inventors: Takeo Kagami, Tokyo (JP); Takayasu Kanaya, Tokyo (JP)

(73) Assignee: TDK Corporation, Tokyo (JP)

( * ) Notice: Subject to any disclaimer, the term of this patent is extended or adjusted under 35 U.S.C. 154(b) by 761 days.

(21) Appl. No.: 11/836,529

(22) Filed: Aug. 9, 2007

(65) Prior Publication Data

US 2009/0040660 A1 Feb. 12, 2009

(51) Int. Cl.
*G11B 5/39* (2006.01)
(52) U.S. Cl. .................. 360/319; 360/324.12
(58) Field of Classification Search .......... 360/319, 360/324–324.2
See application file for complete search history.

(56) References Cited

U.S. PATENT DOCUMENTS

| | | | |
|---|---|---|---|
| 6,556,392 B1 * | 4/2003 | Mao et al. | 360/324.12 |
| 6,680,829 B2 * | 1/2004 | Chen et al. | 360/319 |
| 6,943,993 B2 * | 9/2005 | Chang et al. | 360/319 |
| 6,980,403 B2 * | 12/2005 | Hasegawa | 360/319 |
| 7,130,165 B2 * | 10/2006 | Macken et al. | 360/324.12 |
| 7,280,325 B1 * | 10/2007 | Pan | 360/324.12 |
| 7,324,309 B1 * | 1/2008 | Wiesen et al. | 360/319 |
| 2004/0156148 A1 * | 8/2004 | Chang et al. | 360/319 |
| 2005/0264948 A1 * | 12/2005 | Nakamoto et al. | 360/319 |

FOREIGN PATENT DOCUMENTS

| JP | A 2004-213783 | 7/2004 |
|---|---|---|
| JP | A 2005-251254 | 9/2005 |
| JP | 2005353666 A * | 12/2005 |
| JP | A 2006-237377 | 9/2006 |
| JP | A 2006-323900 | 11/2006 |
| JP | 2007157281 A * | 6/2007 |

OTHER PUBLICATIONS

U.S. Appl. No. 11/735,730, filed in the name of Kagami et al. on Apr. 16, 2007.

* cited by examiner

*Primary Examiner* — William J Klimowicz
(74) *Attorney, Agent, or Firm* — Oliff & Berridge, PLC

(57) ABSTRACT

A thin-film magnetic head includes a lower magnetic shield layer, an MR multi-layered structure formed on the lower magnetic shield layer so that current flows in a direction perpendicular to surfaces of laminated layers, an upper magnetic shield layer formed on the MR multi-layered structure, and an additional lower magnetic shield layer directly laminated on the lower magnetic shield layer outside both side ends in a track-width direction of the MR multi-layered structure. The additional lower magnetic shield layer is directly contacted with both side surfaces in a track-width direction of the MR multi-layered structure. A top surface of the additional lower magnetic shield layer is positioned higher in height than a top surface of the lower magnetic shield layer in a region where the MR multi-layered structure is formed.

4 Claims, 12 Drawing Sheets

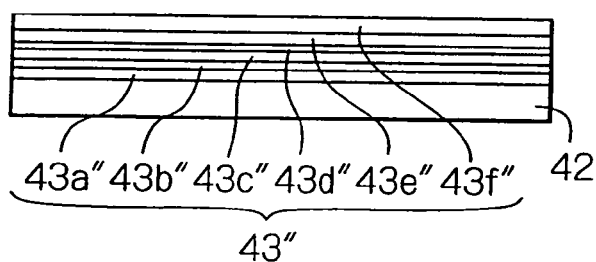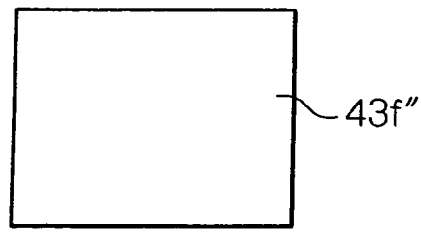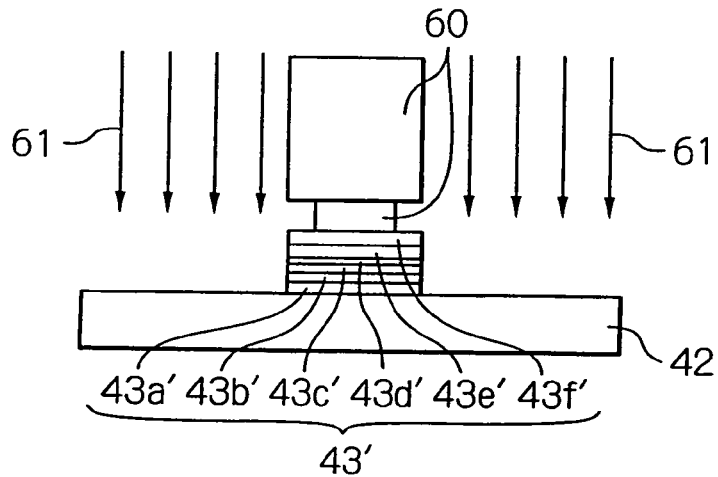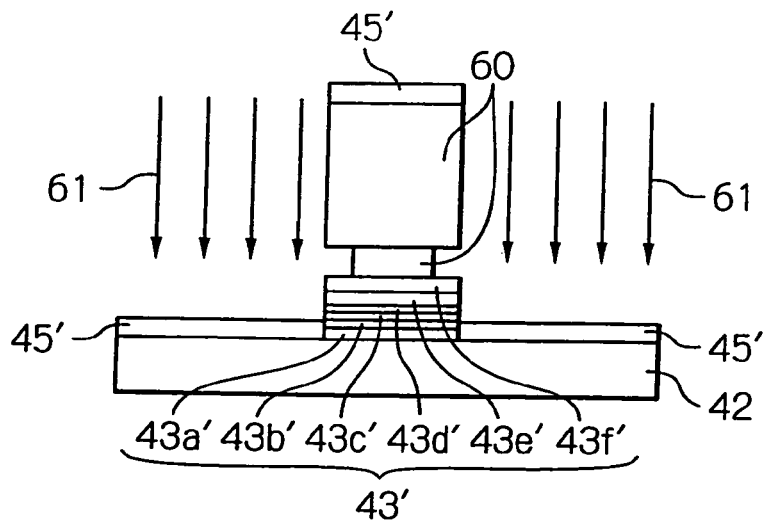

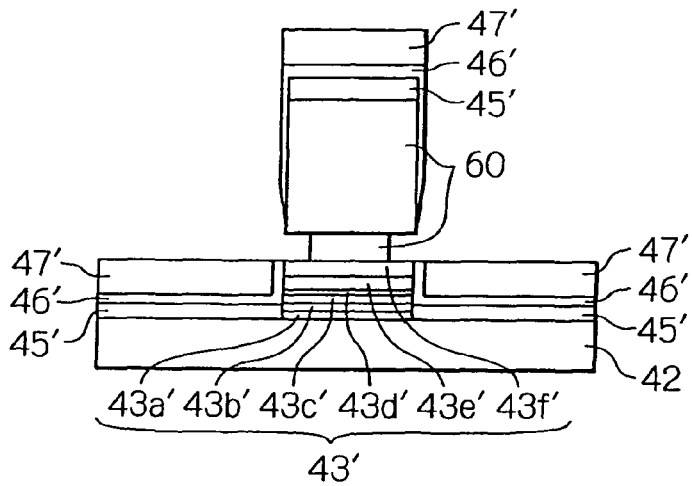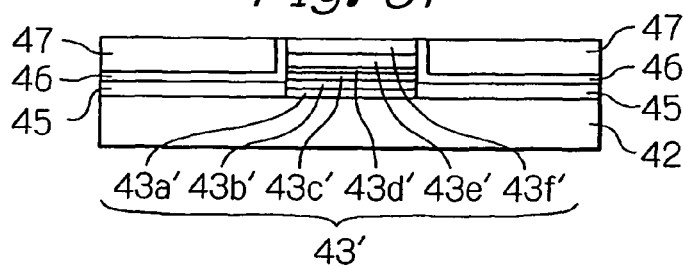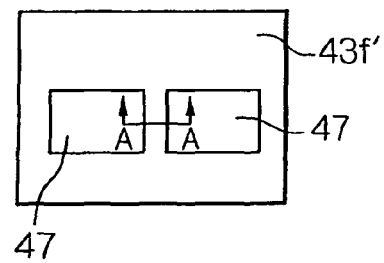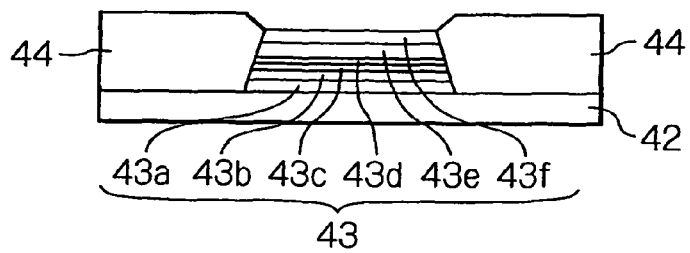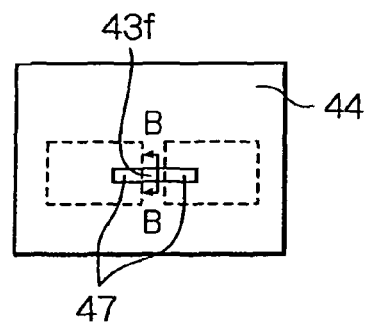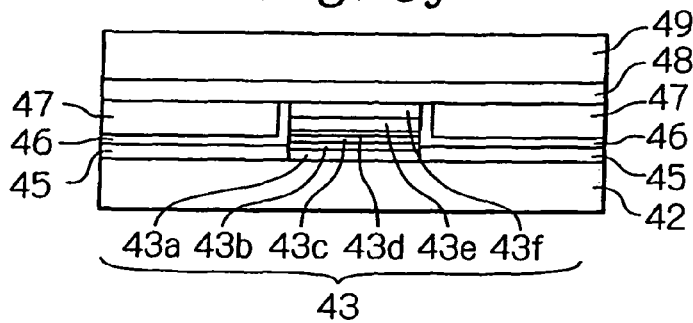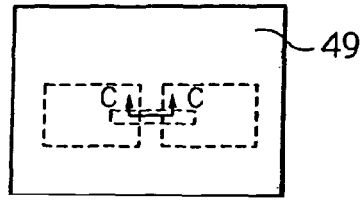

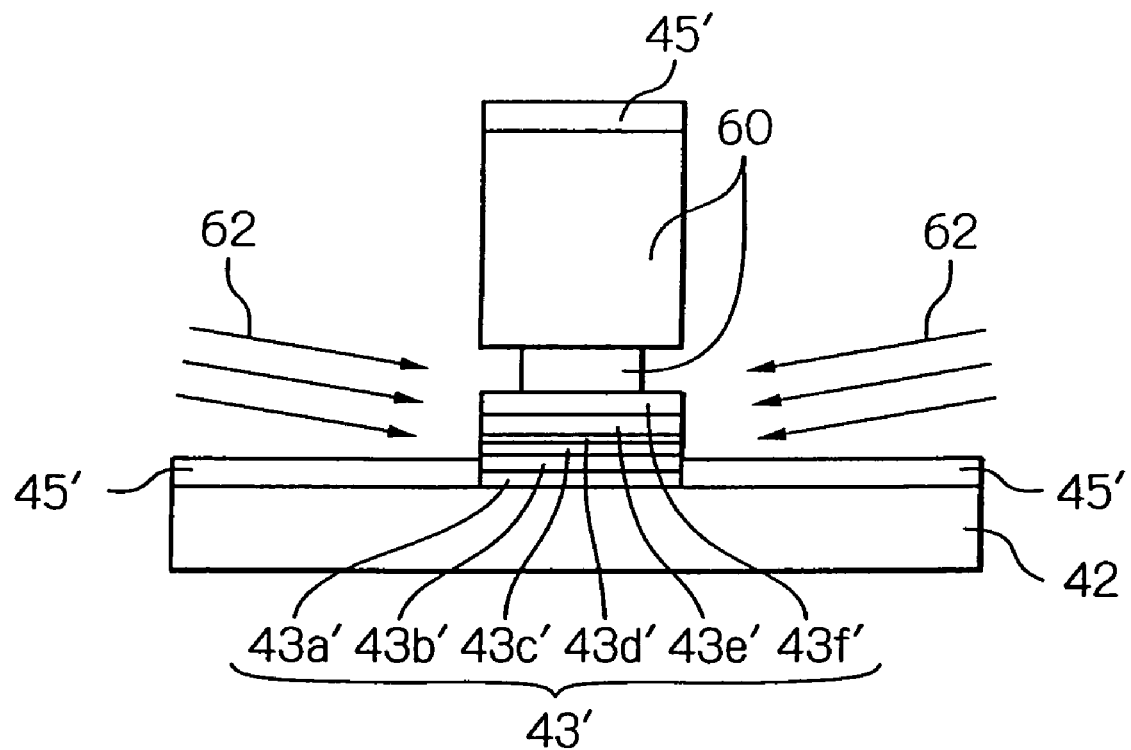

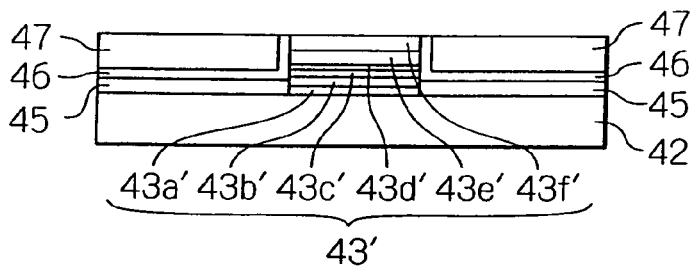
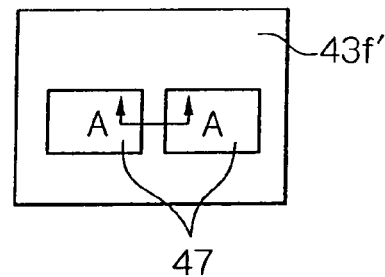
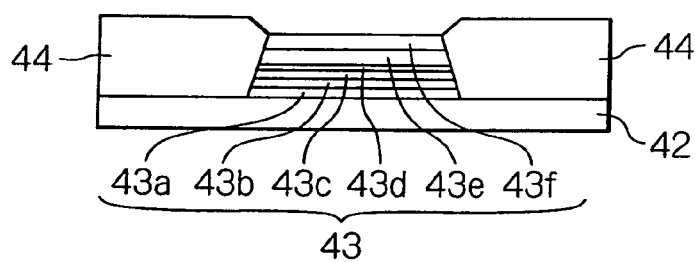
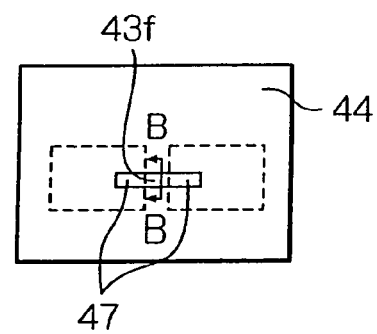
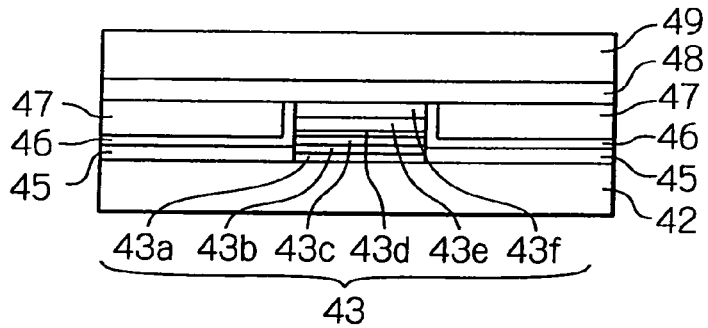
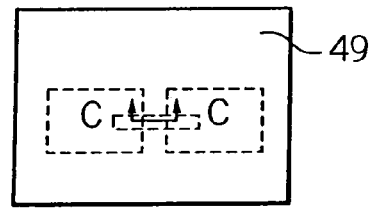

THIN-FILM MAGNETIC HEAD AND MANUFACTURING METHOD THEREOF

BACKGROUND OF THE INVENTION

1. Field of the Invention

The present invention relates to a thin-film magnetic head with a magnetoresistive effect (MR) element for detecting magnetic intensity in a magnetic recording medium and for outputting a read signal, and to a manufacturing method of the thin-film magnetic head.

2. Description of the Related Art

Recently, in order to satisfy the demand for higher recording density and downsizing in a hard disk drive (HDD) apparatus, higher sensitivity and resolution of a thin-film magnetic head are required. Thus, as for a thin-film magnetic head with a recording density performance of 100 Gbspi or more, a tunnel magnetoresistive effect (TMR) head with a TMR read head element having a current perpendicular to plane (CPP) structure capable of achieving higher sensitivity and resolution is coming into practical use instead of a general giant magnetoresistive effect (GMR) head with a GMR read head element having a current in plane (CIP) structure.

The head structure in which a sense current flows in a direction parallel with surfaces of laminated layers is called as the CIP structure, whereas the other head structure in which the sense current flows in a direction perpendicular to surfaces of laminated layers is called as the CPP structure. In recent years, GMR heads with the CPP structure are being developed.

Because the CPP structure utilizes magnetic shield layers themselves as electrodes, short-circuit or insufficient insulation between magnetic shield layers and element layer, which had been serious problem for narrowing the read gap in the CIP structure never inherently occurs. Therefore, the CPP structure lends itself to a high recording density head.

Even in the thin-film magnetic head with the CPP structure capable of narrowing the read gap, when it is required to further narrow the read gap in order to scale up high resolution in the track-width direction, it is necessary to narrow a total thickness of the MR multi-layered structure. Typical MR multi-layered structure has a buffer layer/a magnetization-fixed layer (pinning layer/pinned layer)/a spacer layer/a magnetization-free layer (free layer)/a cap layer laminated in this order from the substrate side.

In order to make thinner the total thickness of the MR multi-layered structure, it is necessary to decrease a thickness of upper and lower layers sandwiching the free layer. It is relatively easy to realize an MR multi-layered structure with a thin cap layer because the thickness of the cap layer will not have little direct effect on the MR characteristics. However, if a space between the upper magnetic shield layer and the free layer narrows less than 10 nm by thinning the cap layer, magnetic couplings will be induced between the upper magnetic shield layer and the free layer and between the upper magnetic shield layer and the magnetic domain control layer causing the output from the MR element to become instable. Thus, important is to decrease the thickness of the buffer layer/the magnetization-fixed layer. However, it is difficult to dramatically decrease the thickness of these layers if an MR ratio of the MR element and a magnetic stability of the magnetization-fixed layer are taken into consideration.

SUMMARY OF THE INVENTION

It is therefore an object of the present invention to provide a thin-film magnetic head and a manufacturing method of a thin-film magnetic head, whereby an effective read gap width and a track width can be narrowed without decreasing a total thickness of an MR multi-layered structure.

According to the present invention, a thin-film magnetic head includes a lower magnetic shield layer, an MR multi-layered structure formed on the lower magnetic shield layer so that current flows in a direction perpendicular to surfaces of laminated layers, an upper magnetic shield layer formed on the MR multi-layered structure, and an additional lower magnetic shield layer directly laminated on the lower magnetic shield layer outside both side ends in a track-width direction of the MR multi-layered structure. The additional lower magnetic shield layer is directly contacted with both side surfaces in a track-width direction of the MR multi-layered structure. A top surface of the additional lower magnetic shield layer is positioned higher in height than a top surface of the lower magnetic shield layer in a region where the MR multi-layered structure is formed.

Because the top surface of the additional lower magnetic shield layer is positioned higher in height than the top surface of the lower magnetic shield layer in a region where the MR multi-layered structure is formed, a substantial lower magnetic shield layer consisting of the lower magnetic shield layer and the additional lower magnetic shield layer exhibits a better or increased magnetic shield effect for absorbing unnecessary magnetic field that may be applied to the MR multi-layered structure. Namely, shielding effect in a track-width direction and a bit direction can be improved to enhance the resolution of the thin-film magnetic head in a track-width direction and a bit direction. Particularly, according to the present invention, since the additional lower magnetic shield layer directly contacts with the both side surfaces in the track-width direction, of the MR multi-layered structure, the magnetic shield effect of the additional lower magnetic shield layer can be more increased. Furthermore, because the additional lower magnetic shield layer is directly laminated on the lower magnetic shield layer outside the both sides in the track-width direction, of the MR multi-layered structure, an exchange coupling will be produced between the lower magnetic shield layer and the additional lower magnetic shield layer. Since the magnetization directions in these shield layers are the same direction, it is possible to greatly reduce the output instability of the head.

It is preferred that the MR multi-layered structure has a magnetization-fixed layer, a tunnel barrier layer or spacer layer laminated on the magnetization-fixed layer, and a magnetization-free layer laminated on the tunnel barrier layer or spacer layer, and that the top surface of the additional lower magnetic shield layer is positioned lower in height than a bottom surface of the magnetization-free layer of the MR multi-layered structure. Thus, the additional lower magnetic shield layer will not be in contact with the magnetization-free layer and therefore the additional lower magnetic shield layer will not short the tunnel barrier layer or spacer layer.

It is also preferred that the additional lower magnetic shield layer is made of the same soft magnetic material as the lower magnetic shield layer, or that the additional lower magnetic shield layer is made of a soft magnetic material different from that of the lower magnetic shield layer.

It is further preferred that the MR multi-layered structure is a TMR multi-layered structure or a CPP type GMR multi-layered structure.

According to the present invention, also, a manufacturing method of a thin-film magnetic head includes a step of depositing MR multi-layered films on a lower magnetic shield layer made of a soft magnetic material, a step of etching the deposited MR multi-layered films for defining a track width to form an MR multi-layered structure, the etching being performed through a first mask formed on the deposited MR multi-layered films, a step of depositing a film of a soft magnetic material with remaining the first mask, a step of depositing a film for an insulation layer and films for a magnetic domain control layer with remaining the first mask, a step of removing the first mask to perform lift-off, and a step of forming an upper magnetic shield layer on the MR multi-layered structure.

A film of a soft magnetic material is deposited with remaining the first mask, a film for an insulation layer and films for a magnetic domain control layer are deposited with remaining the first mask, and then lift-off is performed. Thus, this deposited soft magnetic material film is formed as the additional lower magnetic shield layer whose top surface is positioned higher in height than the top surface of the lower magnetic shield layer in a region where the MR multi-layered structure is formed. Therefore, a substantial lower magnetic shield layer consisting of the lower magnetic shield layer and the additional lower magnetic shield layer exhibits a better or increased magnetic shield effect for absorbing unnecessary magnetic field that may be applied to the MR multi-layered structure. Namely, shielding effect in a track-width direction and a bit direction can be improved to enhance the resolution of the thin-film magnetic head in a track-width direction and a bit direction. Also, since the additional lower magnetic shield layer is formed only by adding one process for depositing the soft magnetic material film, the manufacturing process will not be so complicated. Further, since the additional lower magnetic shield layer is formed by this deposition of the soft magnetic material film to directly contact with the both side surfaces in the track-width direction, of the MR multi-layered structure, the magnetic shield effect of the additional lower magnetic shield layer can be more increased. Still further, because the additional lower magnetic shield layer is directly laminated on the lower magnetic shield layer outside the both sides in the track-width direction, of the MR multi-layered structure, an exchange coupling will be produced between the lower magnetic shield layer and the additional lower magnetic shield layer. Since the magnetization directions in these shield layers are the same direction, it is possible to greatly reduce the output instability of the head.

It is preferred that the etching step includes a dry-etching step performed using a beam component with an inclined angle equal to or less than 90 degrees and equal to or more than 45 degrees with respect to a substrate surface. Preferably, this dry etching is ion beam etching (IBE) or reactive ion etching (RIE).

It is also preferred that the step of depositing the soft magnetic material film includes depositing the soft magnetic material using a beam component with an inclined angle substantially equal to 90 degrees with respect to a substrate surface. In this case, it is preferred that the method further includes a dry etching step performed, after the step of depositing the soft magnetic material film, using a beam component with an inclined angle equal to or less than 45 degrees with respect to a substrate surface to remove a soft magnetic material deposited on side surfaces of the MR multi-layered structure.

It is further preferred that the method further includes a step of etching, after the removing step, the etched MR multi-layered films for defining a height in a direction perpendicular to the track width to form the MR multi-layered structure, the etching being performed through a second mask formed on the etched MR multi-layered films, a step of depositing a film for an insulation layer with remaining the second mask, and a step of removing the second mask to perform lift-off.

It is still further preferred that the soft magnetic material of the lower magnetic shield layer is the same as the soft magnetic material of the film deposited, or that the soft magnetic material of the lower magnetic shield layer is different from the soft magnetic material of the film deposited.

It is further preferred that the MR multi-layered structure is a TMR multi-layered structure or a CPP type GMR multi-layered structure.

It is still further preferred that the method further includes a step of forming many thin-film magnetic heads on a wafer, a step of cutting the wafer into a plurality of bars so that each bar has a plurality of thin-film magnetic heads aligned with each other, a step of lapping each bar, and a step of separating the lapped bar into a plurality of individual thin-film magnetic heads.

According to the present invention, furthermore, a manufacturing method of a thin-film magnetic head includes a step of depositing MR multi-layered films on a lower magnetic shield layer made of a soft magnetic material, a step of etching the deposited MR multi-layered films for defining a track width to form an MR multi-layered structure, a step of depositing a film of a soft magnetic material on the etched MR multi-layered films, a step of depositing a film for an insulation layer and films for a magnetic domain control layer on the deposited soft magnetic material film, a step of planarizing a top surface thereof, and a step of forming an upper magnetic shield layer on the MR multi-layered structure.

A film of a soft magnetic material is deposited with remaining the first mask, a film for an insulation layer and films for a magnetic domain control layer are deposited with remaining the first mask, and then its top surface is planarized. Thus, this deposited soft magnetic material film is formed as the additional lower magnetic shield layer whose top surface is positioned higher in height than the top surface of the lower magnetic shield layer in a region where the MR multi-layered structure is formed. Therefore, a substantial lower magnetic shield layer consisting of the lower magnetic shield layer and the additional lower magnetic shield layer exhibits a better or increased magnetic shield effect for absorbing unnecessary magnetic field that may be applied to the MR multi-layered structure. Namely, shielding effect in a track-width direction and a bit direction can be improved to enhance the resolution of the thin-film magnetic head in a track-width direction and a bit direction. Also, since the additional lower magnetic shield layer is formed only by adding one process for depositing the soft magnetic material film, the manufacturing process will not be so complicated. Further, since the additional lower magnetic shield layer is formed by this deposition of the soft magnetic material film to directly contact with the both side surfaces in the track-width direction, of the MR multi-layered structure, the magnetic shield effect of the additional lower magnetic shield layer can be more increased. Still further, because the additional lower magnetic shield layer is directly laminated on the lower magnetic shield layer outside the both sides in the track-width direction, of the MR multi-layered structure, an exchange coupling will be produced between the lower magnetic shield layer and the additional lower magnetic shield layer. Since the magnetization directions in these shield layers are the same direction, it is possible to greatly reduce the output instability of the head.

It is preferred that the etching step includes a dry-etching step performed through a first mask formed on the deposited MR multi-layered films, using a beam component with an inclined angle equal to or less than 90 degrees and equal to or more than 45 degrees with respect to a substrate surface. Preferably, the dry etching is IBE or RIE.

It is also preferred that the step of depositing the soft magnetic material film includes depositing the soft magnetic material using a beam component with an inclined angle substantially equal to 90 degrees with respect to a substrate surface. In this case, it is more preferred that the method further includes a dry etching step performed, after the step of depositing the soft magnetic material film, using a beam component with an inclined angle equal to or less than 45 degrees with respect to a substrate surface to remove a soft magnetic material deposited on side surfaces of the MR multi-layered structure.

It is further preferred that the method further includes a step of etching, after the planarizing step, the planarized MR multi-layered films for defining a height in a direction perpendicular to the track width to form the MR multi-layered structure, the etching being performed through a second mask formed on the planarized MR multi-layered films, a step of depositing a film for an insulation layer with remaining the second mask, and a step of removing the second mask to perform lift-off.

It is still further preferred that the soft magnetic material of the lower magnetic shield layer is the same as the soft magnetic material of the film deposited, or that the soft magnetic material of the lower magnetic shield layer is different from the soft magnetic material of the film deposited.

It is further preferred that the MR multi-layered structure is a TMR multi-layered structure or a CPP type GMR multi-layered structure.

It is still further preferred that the method further includes a step of forming many thin-film magnetic heads on a wafer, a step of cutting the wafer into a plurality of bars so that each bar has a plurality of thin-film magnetic heads aligned with each other, a step of lapping each bar, and a step of separating the lapped bar into a plurality of individual thin-film magnetic heads.

Further objects and advantages of the present invention will be apparent from the following description of preferred embodiments of the invention as illustrated in the accompanying drawings.

BRIEF DESCRIPTION OF THE DRAWINGS

FIGS. 6a to 6k show sectional views and plane views illustrating a part of wafer process for fabricating the TMR read head element part of the thin-film magnetic head in an embodiment of a manufacturing method according to the present invention;

FIG. 8 shows a sectional view illustrating a process performed next to the process shown in FIG. 6d in a modification of the embodiment shown in FIGS. 6a to 6k;

FIGS. 10a to 10k show sectional views and plane views illustrating a part of wafer process for fabricating the TMR read head element part of the thin-film magnetic head in another embodiment of a manufacturing method according to the present invention.

DESCRIPTION OF THE PREFERRED EMBODIMENTS

Figure 1:
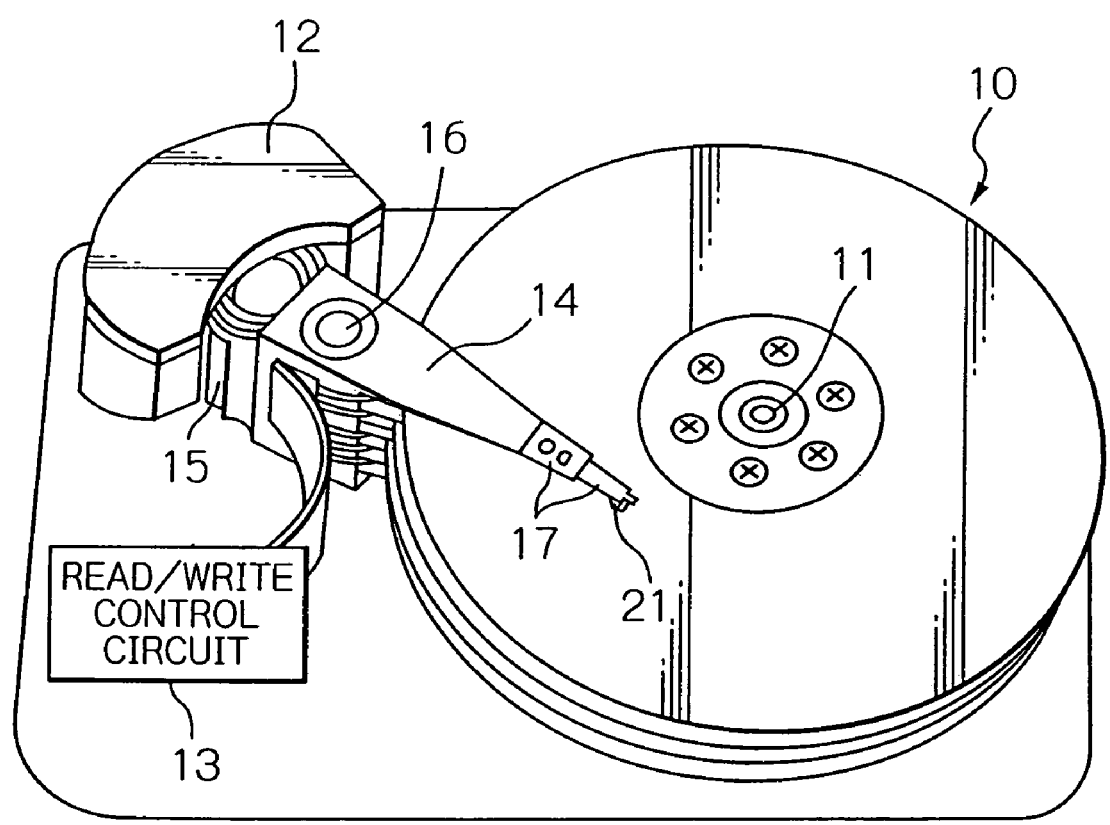
FIG. 1 is a perspective view schematically illustrating the main structure of a magnetic disk drive apparatus as an embodiment according to the present invention.
Figure 2:
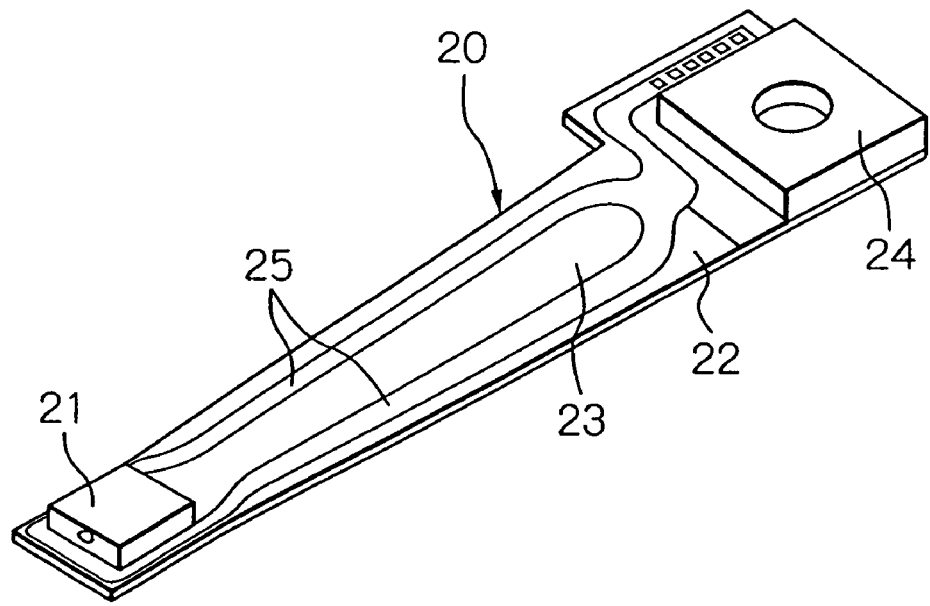
FIG. 2 is a perspective view illustrating an example of the structure of a head gimbal assembly (HGA) shown in FIG. 1.
Figure 3:
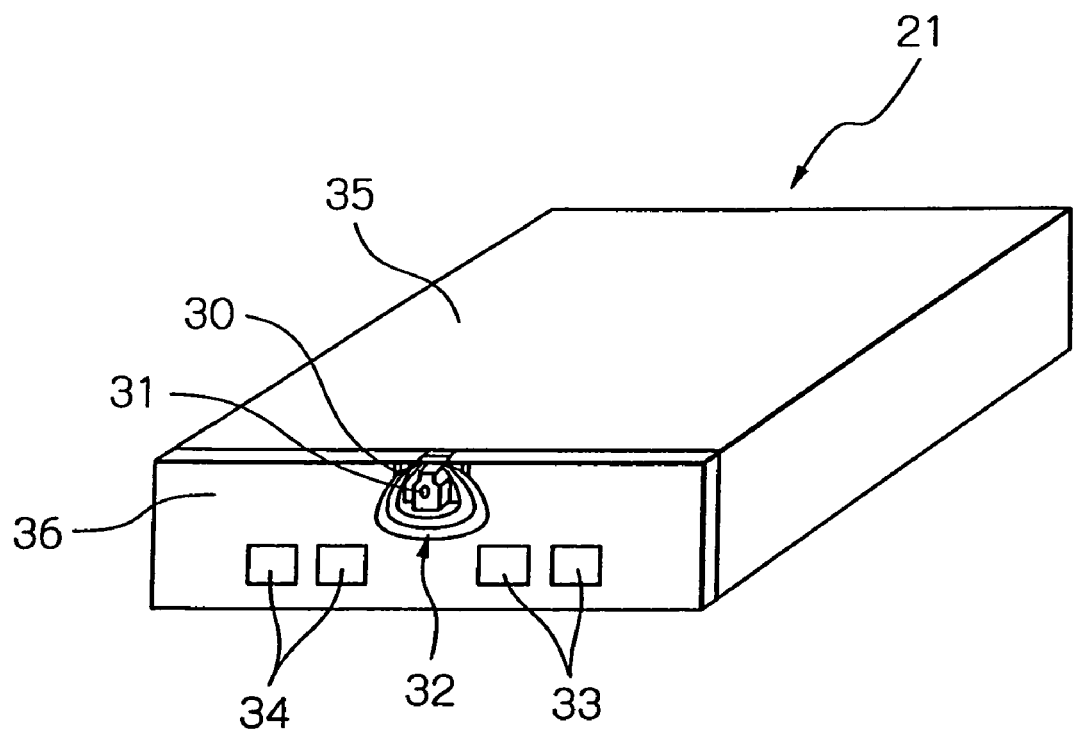
FIG. 3 is a perspective view illustrating a thin-film magnetic head mounted at the end of the HGA of FIG. 2.

FIG. 1 schematically illustrates the main structure of a magnetic disk drive apparatus according to an embodiment of the present invention, FIG. 2 illustrates an example of the structure of an HGA of FIG. 1, and FIG. 3 illustrates the composite thin-film magnetic head mounted at the end of the HGA of FIG. 2.

In FIG. 1, a reference numeral 10 denotes a plurality of magnetic disks that rotate about a rotary axis of a spindle motor 11, 12 denotes an assembly carriage device for positioning the thin-film magnetic heads or magnetic head sliders on the track, and 13 denotes a read/write control circuit for controlling the read/write operation of the thin-film magnetic heads, respectively.

The assembly carriage device 12 includes a plurality of drive arms 14. The drive arms 14 are swingable about a pivot-bearing axis 16 by a voice coil motor (VCM) 15, and are stacked in a direction along this axis 16. Each of the drive arms 14 has an HGA 17 mounted at the end thereof. The HGA 17 includes a magnetic head slider 21 facing the surface of each magnetic disk 10. In modifications, the magnetic disk drive apparatus may include only a single magnetic disk 10, drive arm 14 and HGA 17.

As shown in FIG. 2, in each HGA, the magnetic head slider 21 is fixed onto the end of a suspension 20. The magnetic head slider 21 has a TMR read head element and an inductive write head element. Further, in the HGA, a terminal electrode of the magnetic head slider 21 is electrically connected to an end of a wiring member 25.

The suspension 20 includes mainly a load beam 22, a flexure 23, a base plate 24 and the wiring member 25. The load beam 22 generates a load to be applied to the magnetic head slider 21. The flexure 23 having elasticity is fixed onto and supported by the load beam 22. The base plate 24 is arranged on the base of the load beam 22. The wiring member 25 is arranged on the flexure 23 and the load beam 22, and includes lead conductors and connection pads electrically connected to both ends of the lead conductors.

It is obvious that the structure of the suspension according to the present invention is not limited to the above. Furthermore, although it is not shown, a head drive IC chip may be mounted on a middle of the suspension 20.

As shown in FIG. 3, the magnetic head slider 21 of this embodiment includes a composite thin-film magnetic head 32 and four signal terminal electrodes 33 and 34, on an element formed surface 36 that is one side surface when an air bearing surface (ABS) 35 of the magnetic head slider serves as the bottom surface. The thin-film magnetic head 32 includes a TMR read head element 30 and an inductive write head element 31 that are mutually stacked. The four signal terminal electrodes 33 and 34 are electrically connected to the TMR read head element 30 and the inductive write head element 31, respectively. The positions of these terminal electrodes are not limited to those shown in FIG. 3.

Figure 4:
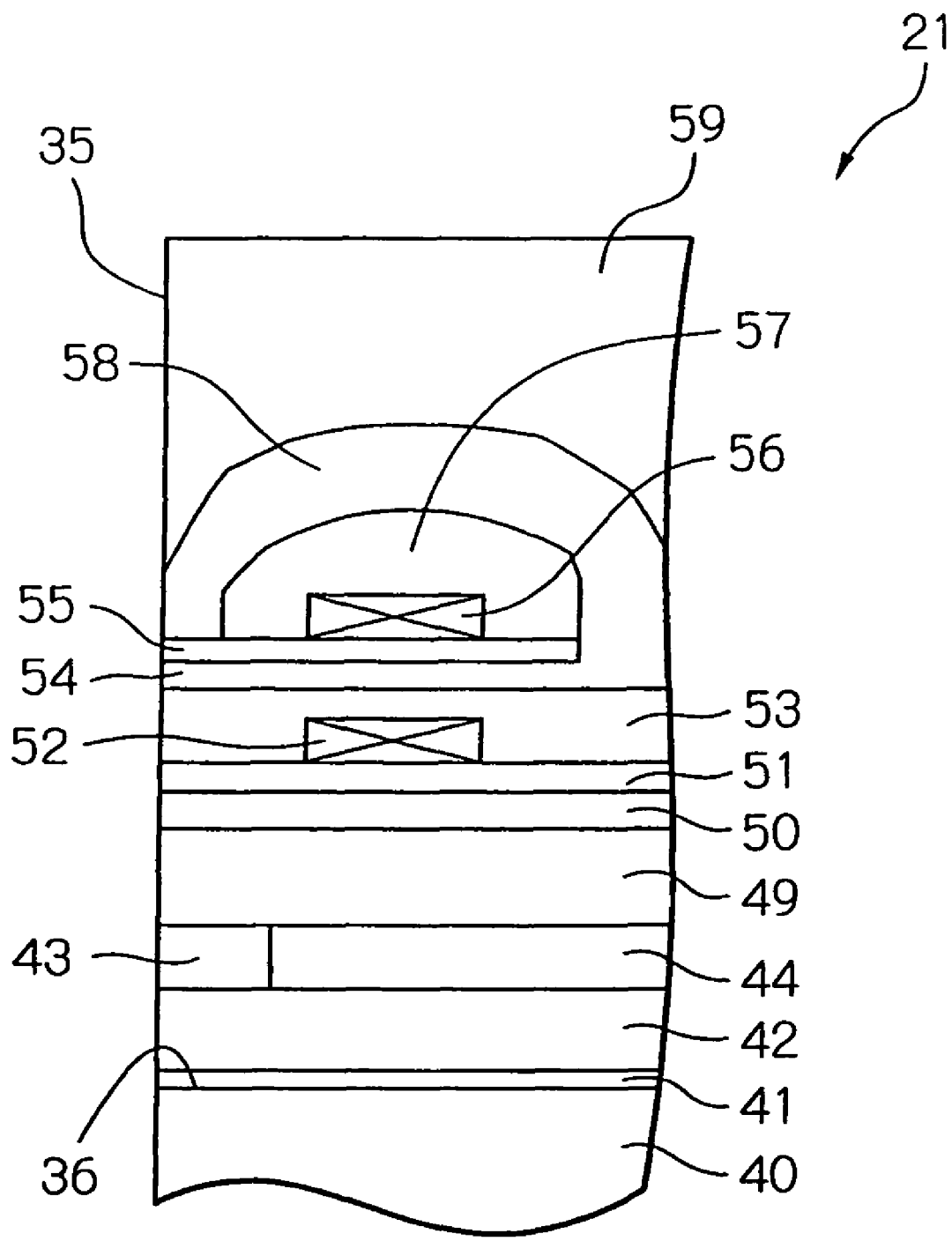
FIG. 4 is a central cross sectional view schematically illustrating the structure of the thin-film magnetic head of FIG. 3.
Figure 5:
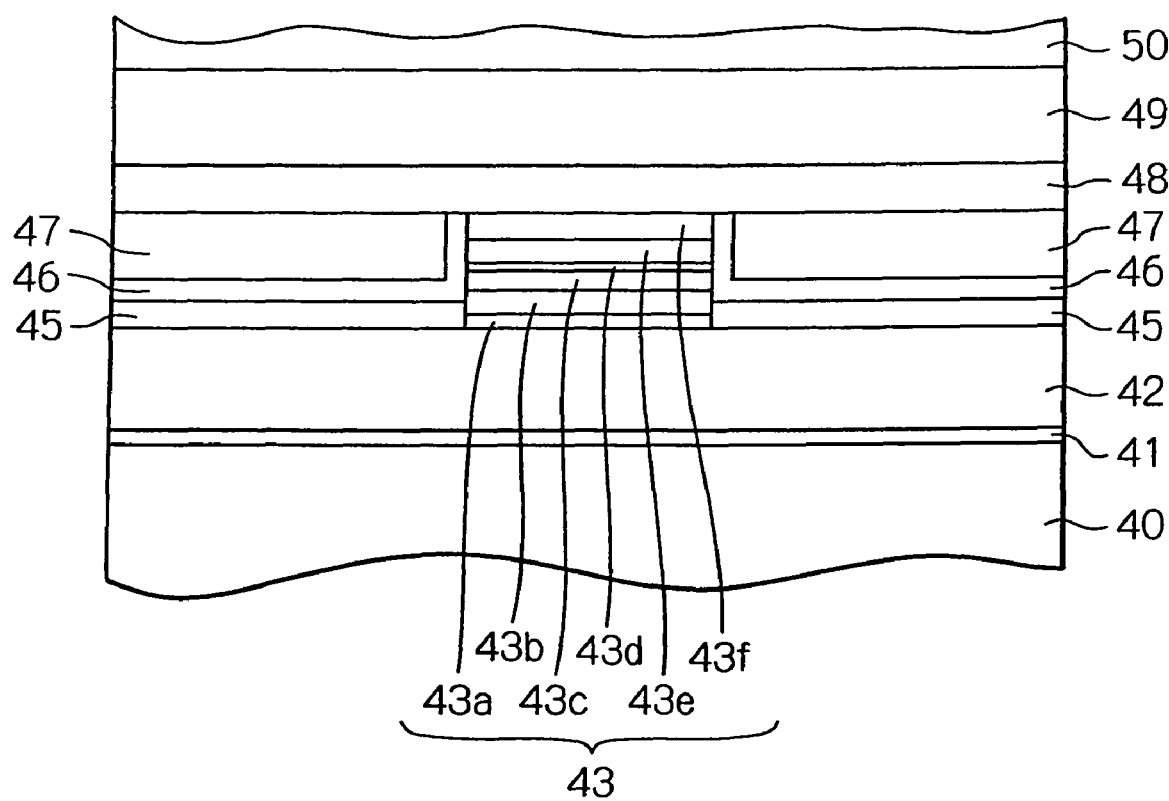
FIG. 5 is a cross sectional view schematically illustrating the structure of a TMR read head element part of the thin-film magnetic head of FIG. 4.

FIG. 4 schematically illustrates the structure of the thin-film magnetic head in this embodiment, and FIG. 5 schematically illustrates the structure of a TMR read head element part of the thin-film magnetic head, seen from the ABS side. In this embodiment, the inductive write head element consists of a write head element with a perpendicular magnetic recording structure, and the TMR read head element is used. However, a GMR read head element with a CPP structure may be used as for the read head element. In the latter case, fundamental layer structure is the same as the TMR read head element except that a nonmagnetic conductive layer is used instead of the tunnel barrier layer.

In this specification, terms of "upper direction", "upper side", "upper", and "top surface" represent "opposite direction to the substrate (upper direction in FIG. 5)", "side opposite the substrate", "portion opposite the substrate", and "surface opposite the substrate", respectively. Also, terms of "lower direction", "lower side", "lower", and "bottom surface" represent "direction toward the substrate (lower direction in FIG. 5)", "side toward the substrate", "portion toward the substrate", and "surface toward the substrate", respectively. Furthermore, a term of "track-width direction" represents "direction parallel to the ABS and to the lamination plane of thin-films (direction of right and left directions in FIG. 5)", and a term of "height direction" represents "direction leaving from the ABS (direction toward the back direction in FIG. 5)".

The ABS 35 facing the surface of the magnetic disk is formed on a slider substrate 40. In operation, the magnetic head slider 21 hydrodynamically flies above the rotating magnetic disk with a predetermined flying height. An under insulation layer 41 is stacked on the element forming surface 36 of the slider substrate 40. A lower magnetic shield layer 42 is stacked on the under insulation layer 41. This layer 42 can serve also as a lower electrode layer.

A TMR multi-layered structure 43, an insulation layer 44 (FIG. 4) and an additional lower magnetic shield layer 45 (FIG. 5) described later are stacked on the lower magnetic shield layer 42.

The TMR multi-layered structure has as will be describe in detail later multi-layers of a magnetization-fixed layer consisting of a pinning layer 43b made of an anti-ferromagnetic material and a pinned layer 43c, a tunnel barrier layer 43d, and a magnetization-free layer 43e. The above-mentioned additional lower magnetic shield layer 45, an insulation layer 46 and a magnetic bias layer 47, that is a longitudinal (track-width direction) magnetic bias layer 47, for controlling the magnetic domain of the free layer 43e are formed on the side surfaces of the TMR multi-layered structure 43.

An upper metal layer 48 (FIG. 5) and an upper magnetic shield layer 49 are sequentially stacked on the TMR multi-layered structure 43 and the magnetic bias layer 47. This upper magnetic shield layer 49 serves also as an upper electrode layer.

The TMR read head element is basically composed of the lower magnetic shield layer 42, the TMR multi-layered structure 43, the insulation layer 44, the upper metal layer 48, the upper magnetic shield layer 49, the additional lower magnetic shield layer 45, the magnetic bias layer 47 and lead conductor layer (not shown).

On the upper magnetic shield layer 49, a nonmagnetic intermediate layer 50 for separating the TMR read head element and the inductive write head element thereon is stacked.

As shown in FIG. 4, on the nonmagnetic intermediate layer 50, the inductive write head element is formed. This write head element includes an insulation layer 51, a backing coil layer 52, a backing coil insulation layer 53, a main magnetic pole layer 54, an insulation gap layer 55, a write coil layer 56, a write coil insulation layer 57 and an auxiliary magnetic pole layer 58. A protective layer 59 is arranged on the inductive write head element.

In this embodiment, the inductive write head element consists of a write head element with a perpendicular magnetic recording structure. However, the inductive write head element may be a write head element with a plane or horizontal magnetic recording structure. Also, perpendicular magnetic recording structure inductive write head elements having various structures other than that illustrated in FIG. 4 may be applied.

Hereinafter, configurations of the TMR read head element part of the thin-film magnetic head will be described in detail with reference to FIG. 5.

As mentioned before, in the TMR read head element part of the thin-film magnetic head in this embodiment, the under insulation layer 41 is stacked on the substrate 40, the lower magnetic shield layer 42 that also serves as the lower electrode is stacked on the under insulation layer 41, and the TMR multi-layered structure 43 is stacked thereon. The TMR multi-layered structure 43 has a lower metal layer 43a made of a nonmagnetic metal material, the pinning layer 43b made of an anti-ferromagnetic material, the pinned layer 43c with multi-layers made of a ferromagnetic material and a nonmagnetic material, the tunnel barrier layer 43d made of an insulation material, the free layer 43e with multi-layers made of soft magnetic material, and the cap layer 43f made of a non-magnetic metal material, laminated in this order.

On right and left sides in the track-width direction of this TMR multi-layered structure 43, the additional lower magnetic shield layer 45 made of a soft magnetic material is directly stacked on the lower magnetic shield layer 42. On this additional lower magnetic shield layer 45, the insulation layer 46 made of an insulation material and the magnetic bias layer 47 made of a hard magnetic material are stacked in this order. On back side of FIG. 5, that is in the height direction, an insulation layer 44 (FIGS. 4, 6h and 6i) made of an insulation material is formed. In modification, the pinned layer may be formed in a single layer structure of a ferromagnetic material and/or the free layer may be formed in a single layer structure of a ferromagnetic material.

On the TMR multi-layered structure 43, the magnetic bias layer 47 and the insulation layer 44, the upper metal layer 48 for adjusting an MR gap and the upper magnetic shield layer 49 are sequentially stacked in this order. The upper metal layer 48 is made of a nonmagnetic metal material. The upper magnetic shield layer 49 is made of a soft magnetic material and also serves as the upper electrode layer for feeding a current through the TMR multi-layered structure 43.

The additional lower magnetic shield layer 45 is formed so that its top surface is positioned higher in height than the top surface of the lower magnetic shield layer 42 in a region where the TMR multi-layered structure 43 is formed. Thus, a substantial lower magnetic shield layer consisting of the lower magnetic shield layer 42 and the additional lower magnetic shield layer 45 exhibits a better or increased magnetic shield effect for absorbing unnecessary magnetic field that may be applied to the TMR multi-layered structure 43. Also, since the additional lower magnetic shield layer 45 directly contacts with the both side surfaces in the track-width direction, of the TMR multi-layered structure 43, the magnetic shield effect of the additional lower magnetic shield layer 45 can be more increased.

Furthermore, in this embodiment, the additional lower magnetic shield layer 45 is directly stacked on the lower magnetic shield layer 42 outside the both sides in the track-width direction, of the TMR multi-layered structure 43. Therefore, an exchange coupling will be produced between the lower magnetic shield layer 42 and the additional lower magnetic shield layer 45. Since the magnetization directions in these shield layers 42 and 45 are the same direction, it is possible to greatly reduce the output instability of the head.

The lower magnetic shield layer 42 and the additional lower magnetic shield layer 45 may be made of the same soft magnetic material or of different soft magnetic materials with each other.

FIGS. 6a to 6k illustrate a part of wafer process for fabricating the TMR read head element part of the thin-film magnetic head according to the present invention. Hereinafter, wafer fabrication process of the thin-film magnetic head will be described with reference to these figures.

First, as shown in FIGS. 6a and 6b, a film 42' for the lower magnetic shield layer 42 is deposited on the under insulation layer 41 (not shown in these figures but shown in FIGS. 4 and 5) formed on the substrate 40 (also not shown in these figures but shown in FIGS. 4 and 5) made of a conductive material such as AlTiC ($Al_2O_3$—TiC). This film 42' is formed by for example frame plating a magnetic metal material such as nickel iron (NiFe), cobalt iron (CoFe), iron nickel cobalt (FeNiCo), iron aluminum silicide (FeAlSi), iron nitride (FeN), iron zirconium nitride (FeZrN), iron tantalum nitride (FeTaN), cobalt zirconium niobium (CoZrNb) or cobalt zirconium tantalum (CoZrTa) to have a thickness of about 100 to 3000 nm. In a desired embodiment, a NiFe film with a thickness of about 2000 nm is deposited as for the film 42' for the lower magnetic shield layer.

Then, TMR multi-layered films 43" are deposited thereon. The TMR multi-layered films 43" have films 43a" for the lower metal layer, a film 43b" for the pinning layer, films 43c" for the pinned layer, a film 43d" for the tunnel barrier layer, films 43e" for the free layer and a film 43f" for the cap layer sequentially laminated each other.

The films 43a" for the lower metal layer consist of a film deposited by sputtering for example tantalum (Ta), chrome (Cr), hafnium (Hf), niobium (Nb), zirconium (Zr), titanium (Ti), molybdenum (Mo) or tungsten (W) to have a thickness of about 0.5 to 5 nm, and a film deposited by sputtering for example ruthenium (Ru), nickel chrome (NiCr), NiFe, nickel iron chrome (NiFeCr), cobalt (Co) or CoFe to have a thickness of about 1 to 6 nm. In a desired embodiment, as the films 43a" for the lower metal layer, a Ta film with a thickness of about 1 nm is deposited and an Ru film with a thickness of about 2 nm is deposited on the Ta film.

The film 43b" for the pinning layer in this embodiment consists of an anti-ferromagnetic material such as iridium manganese (IrMn), platinum manganese (PtMn), nickel manganese (NiMn) or ruthenium rhodium manganese (RuRhMn) deposited by sputtering to have a thickness of about 5 to 30 nm. In a desired embodiment, as the film 43b" for the pinning layer, an IrMn film with a thickness of about 7 nm is deposited.

The films 43c" for the pinned layer are synthetic three-layered films of the ferromagnetic film, the nonmagnetic film and the ferromagnetic film laminated from the bottom in this order. Namely, the films 43c" for the pinned layer consist of the first ferromagnetic film (film for an outer pinned layer) made of CoFe for example having a thickness of about 1 to 5 nm, the nonmagnetic film made of an alloy including one or at least two of Ru, rhodium (Rh), iridium (Ir), Cr, rhenium (Re) and copper (Cu) for example having a thickness of about 0.8 nm, and the second ferromagnetic film (film for an inner pinned layer) made of CoFe, CoFeSi, CoMnGe, CoMnSi or CoMnAl for example having a thickness of about 1 to 3 nm, deposited sequentially by a sputtering method for example. In a desired embodiment, as the films 43c" for the pinned layer, a CoFe film with a thickness of about 3 nm, an Ru film with a thickness of about 0.8 nm and a CoFe film with a thickness of about 3 nm are stacked in this order from the bottom.

The film 43d" for the tunnel barrier layer is made of an oxide including aluminum (Al), Ti, Ta, Zr, Hf, magnesium (Mg), silicon (Si) or zinc (Zn) having a thickness of about 0.5 to 1 nm. In a desired embodiment, as the film 43d" for the tunnel barrier layer, an $Al_2O_3$ film with a thickness of about 0.6 nm is deposited.

The films 43e" for the magnetization-free layer consist of a high polarization film made of CoFe, CoFeSi, cobalt manganese germanium (CoMnGe), cobalt manganese silicon (CoMnSi) or cobalt manganese aluminum (CoMnAl), with a thickness of about 1 nm, and a soft magnetic film made of NiFe with a thickness of about 1 to 9 nm sequentially deposited by a sputtering method, for example. In a desired embodiment, as the films 43e" for the free layer, a CoFe film with a thickness of about 1 nm is deposited and a NiFe film with a thickness of about 4 nm is deposited on the CoFe film.

The film 43f" for the cap layer is made of a nonmagnetic conductive material such as Ta, Ru, Hf, Nb, Zr, Ti, Cr or W with a thickness of about 1 to 10 nm deposited to have a single layer structure or a two or more layers structure by a sputtering method for example. In a desired embodiment, as the film 43f" for the cap layer, a Ta film with a thickness of about 5 nm is deposited.

Then, as shown in FIG. 6c, a two-layered photo-resist pattern 60 is formed thereon and the TMR multi-layered films 43" are patterned by ion milling with ion beam 61 traveling in straight lines, such as IBE or RIE, using the photo-resist pattern 60 as a mask for defining a track width, so as to obtain the lower magnetic shield layer 42 and patterned MR multi-layered films 43' consisting of films 43a' for the lower metal layer, a film 43b' for the pinning layer, films 43c' for the pinned layer, a film 43d' for the tunnel barrier layer, films 43e' for the free layer and a film 43f' for the cap layer.

Then, as shown in FIG. 6d, a film 45' for the additional lower magnetic shield layer is deposited thereon. This film 45' is deposited by for example a sputtering method, an ion beam deposition (IBD) method or an ion plating method, using the beam 61 with an incident angle of 90 degrees with respect to the substrate surface, or a chemical vapor deposition (CVD) method, a soft magnetic material such as NiFe, CoFe, FeNiCo, FeAlSi, FeN, FeZrN, FeTaN, CoZrNb or CoZrTa to have a thickness of about 1 to 15 nm. The film 45' for the additional lower magnetic shield layer should be formed to have a height so that its top surface positions lower than the bottom surface of the film 43e' for the free layer. Thus, the additional lower magnetic shield layer will not be in touch with the free layer to prevent the tunnel barrier layer from being short-circuited by this additional lower magnetic shield layer. In a desired embodiment, a NiFe film with a thickness of about 5 nm is deposited as for the film 45' for the additional lower magnetic shield layer.

Thereafter, as shown in FIG. 6e, a film 46' for the insulation layer and films 47' for the magnetic bias layer are deposited.

The film 46' for the insulation layer is formed from an insulation material such as $Al_2O_3$ or $SiO_2$ deposited by a sputtering method, an IBD method, a CVD method or an atomic layer deposition (ALD) method to have a thickness of about 3 to 10 nm. The films 47' for the magnetic bias layer are formed from an under film made of Cr with a thickness of about 5 nm and a hard ferromagnetic film made of a material mainly composed of Co such as CoPt alloy for example with a thickness of about 5 to 40 nm deposited by a sputtering method or an IBD method for example, and from a bias protection film made of Ta for example with a thickness of about 5 nm deposited thereon by a sputtering method or an IBD method for example. In a desired embodiment, an $Al_2O_3$ film with a thickness of about 5 nm is deposited as the film 46' for the insulation layer, a Cr film with a thickness of about 3 nm is deposited thereon as the under film for the magnetic bias layer, a CoPt film with a thickness of about 15 nm is deposited thereon as the hard ferromagnetic film for the magnetic bias layer, and a Ta film with a thickness of about 4 nm is deposited thereon as the bias protection film.

Thereafter, the photo-resist pattern 60 is removed, namely the lift-off process is performed, so as to obtain the additional lower magnetic shield layer 45, the insulation layer 46 and the magnetic bias layer 47 as shown in FIGS. 6f and 6g. It should be noted that FIG. 6f indicates an A-A line section of FIG. 6g.

Then, a photo-resist pattern (not shown) is formed on the film 43f for the cap layer and the magnetic bias layer 47, and the MR multi-layered films 43' are patterned by ion milling using the photo-resist pattern as a mask for defining a length perpendicular to the track width (length along the MR height), so as to obtain the MR multi-layered structure 43 consisting of the lower metal layer 43a, the pinning layer 43b, the pinned layer 43c, the tunnel barrier layer 43d, the free layer 43e and the cap layer 43f, and a film for the insulation layer 44 is deposited thereon. This film for the insulation layer 44 is formed from an insulation material such as $Al_2O_3$ or $SiO_2$ deposited by a sputtering method, an IBD method or a CVD method to have a thickness of about 60 nm.

Then, the photo-resist pattern is removed, namely the lift-off process is performed, so as to obtain the insulation layer 44 as shown in FIGS. 6h and 6i. It should be noted that FIG. 6h indicates a B-B line section of FIG. 6i seen from a different direction as that of FIG. 6f that indicates the A-A line section of FIG. 6g.

Thereafter, the upper metal layer 48 and the upper magnetic shield layer 49 are deposited thereon as shown in FIGS. 6j and 6k. It should be noted that FIG. 6j indicates a C-C line section of FIG. 6k.

The upper metal layer 48 is formed by depositing a non-magnetic conductive material such as Ta, Ru, Hf, Nb, Zr, Ti, Cr or W, using a sputtering method for example, to have a thickness of about 3 to 20 nm. In a desired embodiment, a Ta film with a thickness of about 5 nm is deposited as for the upper metal layer 48.

The upper magnetic shield layer 49 is formed by depositing a magnetic metal material such as NiFe, CoFe, FeNiCo, FeAlSi, FeN, FeZrN, FeTaN, CoZrNb or CoZrTa, using a frame plating method for example, to have a thickness of about 100 to 3000 nm. In a desired embodiment, a NiFe film with a thickness of about 2000 nm is deposited as for the upper magnetic shield layer 49.

Typically, write head elements are fabricated on thus formed read head elements to complete a thin-film magnetic head wafer.

Figure 7A:
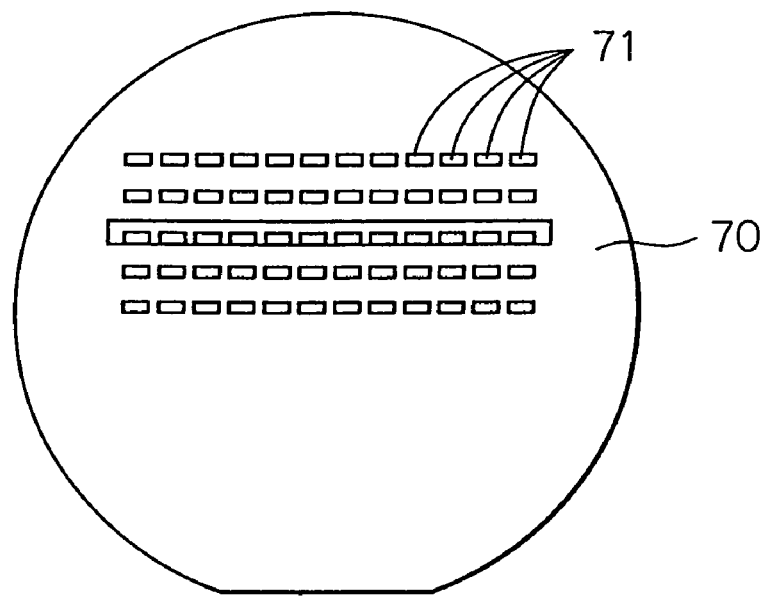
FIGS. 7a to 7c show a plane view, a perspective view and a side view illustrating processes of obtaining bars from the thin-film magnetic head wafer and adjusting an MR-height of the thin-film magnetic head.
Figure 7B:
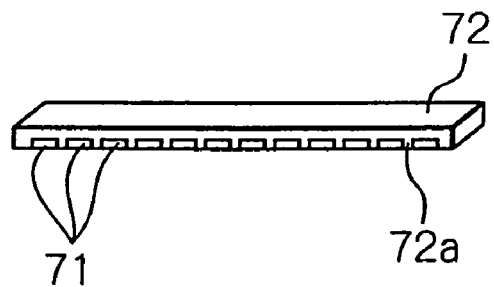
Figure 7C:
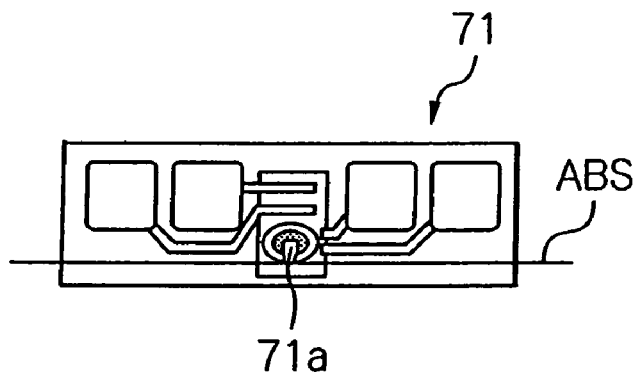

After the above-mentioned wafer process, a plurality of bars are obtained from the fabricated thin-film magnetic head wafer and MR height of each bar is adjusted. FIGS. 7a to 7c illustrate a part of this process for obtaining bars and for adjusting the MR height of each bar.

As shown in FIG. 7a, in the wafer process, many of thin-film magnetic heads 71 are formed to arrange in matrix on an integration surface of a thin-film magnetic head wafer 70. The wafer 70 is then cut into a plurality of bars 72 so that each bar has a plurality of thin-film magnetic heads 71 aligned with each other as shown in FIG. 7b. Then, an ABS side surface 72a of each bar 72 is lapped to adjust the MR height. This MR-height adjustment is executed until a magnetic head element section 71a of each thin-film magnetic head 71 exposes at the ABS as shown in FIG. 7c.

According to the aforementioned processes of this embodiment, because the top surface of the additional lower magnetic shield layer 45 is positioned higher in height than the top surface of the lower magnetic shield layer 42 in a region where the TMR multi-layered structure 43 is formed, a substantial lower magnetic shield layer consisting of the lower magnetic shield layer 42 and the additional lower magnetic shield layer 45 exhibits a better or increased magnetic shield effect for absorbing unnecessary magnetic field that may be applied to the TMR multi-layered structure 43. Also, since the additional lower magnetic shield layer 45 directly contacts with the both side surfaces in the track-width direction, of the TMR multi-layered structure 43, the magnetic shield effect of the additional lower magnetic shield layer 45 can be more increased. Furthermore, in this embodiment, because the additional lower magnetic shield layer 45 is directly stacked on the lower magnetic shield layer 42 outside the both sides in the track-width direction, of the TMR multi-layered structure 43, an exchange coupling will be produced between the lower magnetic shield layer 42 and the additional lower magnetic shield layer 45. Since the magnetization directions in these shield layers 42 and 45 are the same direction, it is possible to greatly reduce the output instability of the head.

FIG. 8 illustrates a modification of the wafer fabrication process shown in FIGS. 6a to 6k.

In this modification, a process shown in FIG. 8 for removing unnecessary film is additionally performed after the process shown in FIG. 6d for depositing the additional lower magnetic shield layer 45. Namely, in this additional process, the film 45' for the additional lower magnetic shield layer attached on side surfaces of the TMR multi-layered films 43', particularly on the side surfaces of the films 43' to short the free layer and the pinned layer via the film for the tunnel barrier layer (or spacer layer), is removed by a low angle milling using beam component 62 with an inclined angle of less than 45 degrees with respect to the surface of the substrate. Other processes in this modification are the same as the fabrication processes shown in FIGS. 6a to 6k.

Table 1 represents a concrete example of layer structure of the TMR read head element part of the thin-film magnetic head in this embodiment. In this Table, a layer represented by a plurality of materials has a multi-layered structure and a layer indicated left hand is a lower side layer. Also, values inside parentheses show layer thickness.

TABLE 1

| | |
|---|---|
| Insulation Layer 40 | $Al_2O_3$(60 nm) |
| Magnetic Bias Layer 47 | Cr(3 nm)/CoPt(15 nm)/Ta(3 nm) |
| Insulation Layer 46 | $Al_2O_3$(5 nm) |
| Additional Lower Magnetic Shield Layer 45 | NiFe(5 nm) |
| Upper Magnetic Shield Layer 49 | NiFe(2000 nm) |
| Upper Metal Layer 48 | Ta(5 nm) |
| Cap Layer 43f | Ta(5 nm) |
| Free Layer 43e | CoFe(1 nm)/NiFe(4 nm) |
| Tunnel Barrier Layer 43d | $Al_2O_3$(0.6 nm) |
| Pinned Layer 43c | CoFe(3 nm)/Ru(0.8 nm)/CoFe(3 nm) |
| Pinning Layer 43b | IrMn(7 nm) |
| Lower Metal Layer 43a | Ta(1 nm)/Ru(2 nm) |
| Lower Magnetic Shield Layer 42 | NiFe(2000 nm) |

Variations in resolution in the track-width direction depending upon position of the top surface of the substantial lower magnetic shield layer, that is the lower magnetic shield layer and the additional lower magnetic shield layer in this embodiment, were actually measured. Table 2 indicates the result of this measurement.

TABLE 2

| Sample | Position of Top Surface of Substantial Lower Magnetic Shield Layer | Half Value Width $W_{MR50}$ | Sharpness Ratio $W_{MR50}/W_{MR10}$ |
| --- | --- | --- | --- |
| 1 | 0 nm | 67 nm | 40.1% |
| 2 | +5 nm | 68 nm | 41.5% |

Figure 9:
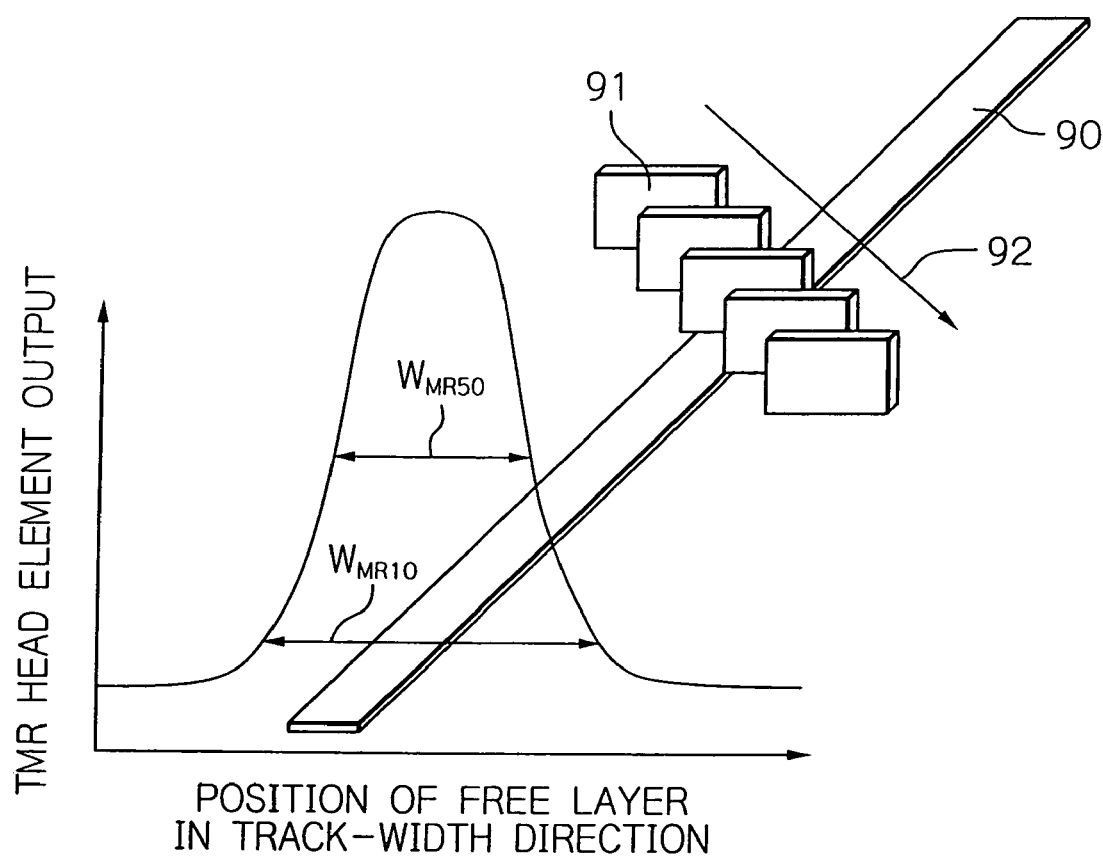
FIG. 9 shows a view illustrating a measurement method for finding out how a resolution in a track-width direction varies depending upon a position of a top surface of a lower magnetic shield layer.

This measurement was done, as shown in FIG. 9, by measuring an output of a TMR read head element when a free layer 91 of the TMR read head element was relatively moved along an arrow 92 with respect to a track 90. Used was a spin stand with a perpendicular magnetic recording magnetic disk of 3.5 inches. An applied voltage to the TMR read head element was 140 mV. A sample 1 corresponds to a conventional art TMR read head element with no additional lower magnetic shield layer. A sample 2 corresponds to a TMR read head element according to the present invention, in which a top surface of an additional lower magnetic shield layer is positioned higher in height by 5 nm than a top surface of a lower magnetic shield layer in a region where the TMR multi-layered structure is formed. The measurement was performed for 100 elements for each sample and each indicated value is an average of the measured values.

As will be noted from Table 2, half value widths (signal widths at half of the maximum output values) $W_{MR50}$ of the respective samples are substantially the same with each other. However, a sharpness ratio $W_{MR50}/W_{MR10}$ of sample 2 according to the present invention is grater than that of sample 1. This means that sample 2 can provide a sharp detection output, so as to increase resolution in the track-width direction. It should be noted that $W_{MR10}$ indicates a $1/10$-value width (a signal width at $1/10$ of the maximum output value).

FIGS. 10a to 10k illustrate a part of wafer process for fabricating a TMR read head element part of a thin-film magnetic head in another embodiment according to the present invention. Hereinafter, wafer fabrication process of the thin-film magnetic head will be described with reference to these figures. In these figures, the same reference numerals are used for the similar components as these in FIGS. 6a to 6k.

Figure 10A:
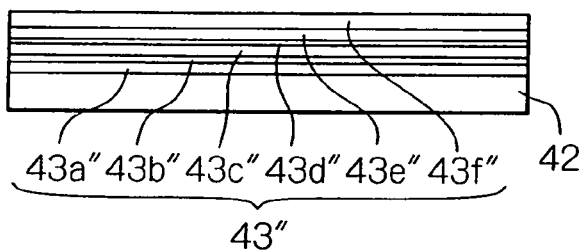
Figure 10B:
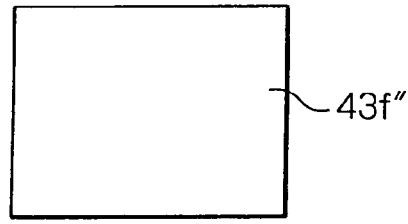

First, as shown in FIGS. 10a and 10b, a film 42' for the lower magnetic shield layer 42 is deposited on the under insulation layer 41 (not shown in these figures but shown in FIGS. 4 and 5) formed on the substrate 40 (also not shown in these figures but shown in FIGS. 4 and 5) made of a conductive material such as AlTiC. This film 42' is formed by for example frame plating a magnetic metal material such as NiFe, CoFe, FeNiCo, FeAlSi, FeN, FeZrN, FeTaN, CoZrNb or CoZrTa to have a thickness of about 100 to 3000 nm. In a desired embodiment, a NiFe film with a thickness of about 2000 nm is deposited as for the film 42' for the lower magnetic shield layer.

Then, TMR multi-layered films 43" are deposited thereon. The TMR multi-layered films 43" have films 43a" for the lower metal layer, a film 43b" for the pinning layer, films 43c" for the pinned layer, a film 43d" for the tunnel barrier layer, films 43e" for the free layer and a film 43f" for the cap layer sequentially laminated each other.

The films 43a" for the lower metal layer consist of a film deposited by sputtering for example Ta, Cr, Hf, Nb, Zr, Ti, Mo or W to have a thickness of about 0.5 to 5 nm, and a film deposited by sputtering for example Ru, NiCr, NiFe, NiFeCr, Co or CoFe to have a thickness of about 1 to 6 nm. In a desired embodiment, as the films 43a" for the lower metal layer, a Ta film with a thickness of about 1 nm is deposited and an Ru film with a thickness of about 2 nm is deposited on the Ta film.

The film 43b" for the pinning layer in this embodiment consists of an anti-ferromagnetic material such as IrMn, PtMn, NiMn or RuRhMn deposited by sputtering to have a thickness of about 5 to 30 nm. In a desired embodiment, as the film 43b" for the pinning layer, an IrMn film with a thickness of about 7 nm is deposited.

The films 43c" for the pinned layer are synthetic three-layered films of the ferromagnetic film, the nonmagnetic film and the ferromagnetic film laminated from the bottom in this order. Namely, the films 43c" for the pinned layer consist of the first ferromagnetic film (film for an outer pinned layer) made of CoFe for example having a thickness of about 1 to 5 nm, the nonmagnetic film made of an alloy including one or at least two of Ru, Rh, Ir, Cr, Re and Cu for example having a thickness of about 0.8 nm, and the second ferromagnetic film (film for an inner pinned layer) made of CoFe, CoFeSi, CoMnGe, CoMnSi or CoMnAl for example having a thickness of about 1 to 3 nm, deposited sequentially by a sputtering method for example. In a desired embodiment, as the films 43c" for the pinned layer, a CoFe film with a thickness of about 3 nm, an Ru film with a thickness of about 0.8 nm and a CoFe film with a thickness of about 3 nm are stacked in this order from the bottom.

The film 43d" for the tunnel barrier layer is made of an oxide including Al, Ti, Ta, Zr, Hf, Mg, Si or Zn having a thickness of about 0.5 to 1 nm. In a desired embodiment, as the film 43d" for the tunnel barrier layer, an $Al_2O_3$ film with a thickness of about 0.6 nm is deposited.

The films 43e" for the magnetization-free layer consist of a high polarization film made of CoFe, CoFeSi, CoMnGe, CoMnSi or CoMnAl, with a thickness of about 1 nm, and a soft magnetic film made of NiFe with a thickness of about 1 to 9 nm sequentially deposited by a sputtering method, for example. In a desired embodiment, as the films 43e" for the free layer, a CoFe film with a thickness of about 1 nm is deposited and a NiFe film with a thickness of about 4 nm is deposited on the CoFe film.

The film 43f" for the cap layer is made of a nonmagnetic conductive material such as Ta, Ru, Hf, Nb, Zr, Ti, Cr or W with a thickness of about 1 to 10 nm deposited to have a single layer structure or a two or more layers structure by a sputtering method for example. In a desired embodiment, as the film 43f" for the cap layer, a Ta film with a thickness of about 5 nm is deposited.

Figure 10C:
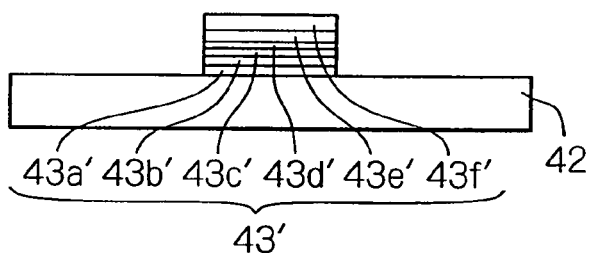

Then, a hard mask or a mask of photo-resist pattern (not shown) is formed thereon and the TMR multi-layered films 43" are patterned by ion milling with ion beam traveling in straight lines, such as IBE or RIE for defining a track width, so as to obtain the lower magnetic shield layer 42 and patterned MR multi-layered films 43' consisting of films 43a' for the lower metal layer, a film 43b' for the pinning layer, films 43c' for the pinned layer, a film 43d' for the tunnel barrier layer, films 43e' for the free layer and a film 43f' for the cap layer. Then, the mask is removed. This state is shown in FIG. 10c. Instead of using the additional mask, the film 43f' for the cap layer may be used as a mask.

Figure 10D:
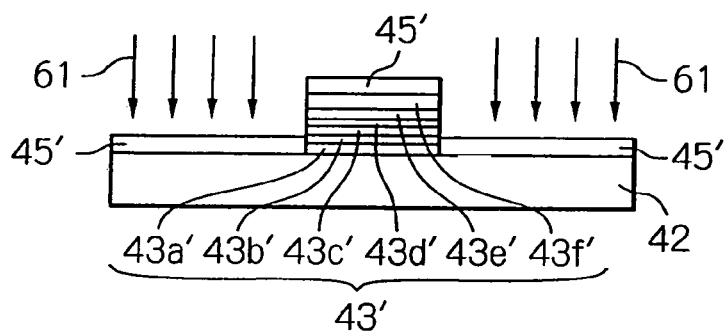

Then, as shown in FIG. 10d, a film 45' for the additional lower magnetic shield layer is deposited thereon. This film 45' is deposited by for example a sputtering method, an IBD method or an ion plating method, using the beam 61 with an incident angle of 90 degrees with respect to the substrate surface, or a CVD method, a soft magnetic material such as NiFe, CoFe, FeNiCo, FeAlSi, FeN, FeZrN, FeTaN, CoZrNb or CoZrTa to have a thickness of about 1 to 15 nm. The film 45' for the additional lower magnetic shield layer should be formed to have a height so that its top surface positions lower than the bottom surface of the film 43e' for the free layer. Thus, the additional lower magnetic shield layer will not be in touch with the free layer to prevent the tunnel barrier layer from being short-circuited by this additional lower magnetic shield layer. In a desired embodiment, a NiFe film with a thickness of about 5 nm is deposited as for the film 45' for the additional lower magnetic shield layer.

Figure 10E:
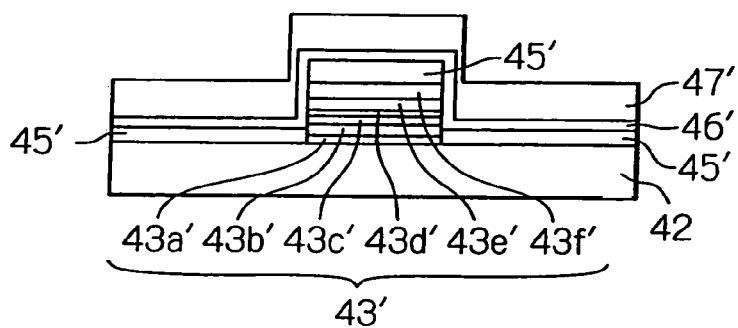

Thereafter, as shown in FIG. 10e, a film 46' for the insulation layer and films 47' for the magnetic bias layer are deposited.

The film 46' for the insulation layer is formed from an insulation material such as $Al_2O_3$ or $SiO_2$ deposited by a sputtering method, an IBD method, a CVD method or an ALD method to have a thickness of about 3 to 10 nm. The films 47' for the magnetic bias layer are formed from an under film made of Cr with a thickness of about 5 nm and a hard ferromagnetic film made of a material mainly composed of Co such as CoPt alloy for example with a thickness of about 5 to 40 nm deposited by a sputtering method or an IBD method for example, and from a bias protection film made of Ta for example with a thickness of about 5 nm deposited thereon by a sputtering method or an IBD method for example. In a desired embodiment, an $Al_2O_3$ film with a thickness of about 5 nm is deposited as the film 46' for the insulation layer, a Cr film with a thickness of about 3 nm is deposited thereon as the under film for the magnetic bias layer, a CoPt film with a thickness of about 15 nm is deposited thereon as the hard ferromagnetic film for the magnetic bias layer, and a Ta film with a thickness of about 4 nm is deposited thereon as the bias protection film.

Thereafter, the top surface thereof is planarized by a chemical mechanical polishing (CMP), so as to obtain the additional lower magnetic shield layer 45, the insulation layer 46 and the magnetic bias layer 47 as shown in FIGS. 10f and 10g. It should be noted that FIG. 10f indicates an A-A line section of FIG. 10g.

Then, a photo-resist pattern (not shown) is formed on the film 43f' for the cap layer and the magnetic bias layer 47, and the MR multi-layered films 43' are patterned by ion milling using the photo-resist pattern as a mask for defining a length perpendicular to the track width (length along the MR height), so as to obtain the MR multi-layered structure 43 consisting of the lower metal layer 43a, the pinning layer 43b, the pinned layer 43c, the tunnel barrier layer 43d, the free layer 43e and the cap layer 43f, and a film for the insulation layer 44 is deposited thereon. This film for the insulation layer 44 is formed from an insulation material such as $Al_2O_3$ or $SiO_2$ deposited by a sputtering method, an IBD method or a CVD method to have a thickness of about 60 nm.

Then, the photo-resist pattern is removed, namely the lift-off process is performed, so as to obtain the insulation layer 44 as shown in FIGS. 10h and 10i. It should be noted that FIG. 10h indicates a B-B line section of FIG. 10i seen from a different direction as that of FIG. 10f that indicates the A-A line section of FIG. 10g.

Thereafter, the upper metal layer 48 and the upper magnetic shield layer 49 are deposited thereon as shown in FIGS. 10j and 10k. It should be noted that FIG. 10j indicates a C-C line section of FIG. 10k.

The upper metal layer 48 is formed by depositing a nonmagnetic conductive material such as Ta, Ru, Hf, Nb, Zr, Ti, Cr or W, using a sputtering method for example, to have a thickness of about 3 to 20 nm. In a desired embodiment, a Ta film with a thickness of about 5 nm is deposited as for the upper metal layer 48.

The upper magnetic shield layer 49 is formed by depositing a magnetic metal material such as NiFe, CoFe, FeNiCo, FeAlSi, FeN, FeZrN, FeTaN, CoZrNb or CoZrTa, using a frame plating method for example, to have a thickness of about 100 to 3000 nm. In a desired embodiment, a NiFe film with a thickness of about 2000 nm is deposited as for the upper magnetic shield layer 49.

Typically, write head elements are fabricated on thus formed read head elements to complete a thin-film magnetic head wafer.

After the above-mentioned wafer process, a plurality of bars are obtained from the fabricated thin-film magnetic head wafer and MR height of each bar is adjusted as already described with reference to FIGS. 7a to 7c.

According to the aforementioned processes of this embodiment, because the top surface of the additional lower magnetic shield layer 45 is positioned higher in height than the top surface of the lower magnetic shield layer 42 in a region where the TMR multi-layered structure 43 is formed, a substantial lower magnetic shield layer consisting of the lower magnetic shield layer 42 and the additional lower magnetic shield layer 45 exhibits a better or increased magnetic shield effect for absorbing unnecessary magnetic field that may be applied to the TMR multi-layered structure 43. Also, since the additional lower magnetic shield layer 45 directly contacts with the both side surfaces in the track-width direction, of the TMR multi-layered structure 43, the magnetic shield effect of the additional lower magnetic shield layer 45 can be more increased. Furthermore, in this embodiment, because the additional lower magnetic shield layer 45 is directly stacked on the lower magnetic shield layer 42 outside the both sides in the track-width direction, of the TMR multi-layered structure 43, an exchange coupling will be produced between the lower magnetic shield layer 42 and the additional lower magnetic shield layer 45. Since the magnetization directions in these shield layers 42 and 45 are the same direction, it is possible to greatly reduce the output instability of the head.

Figure 11:
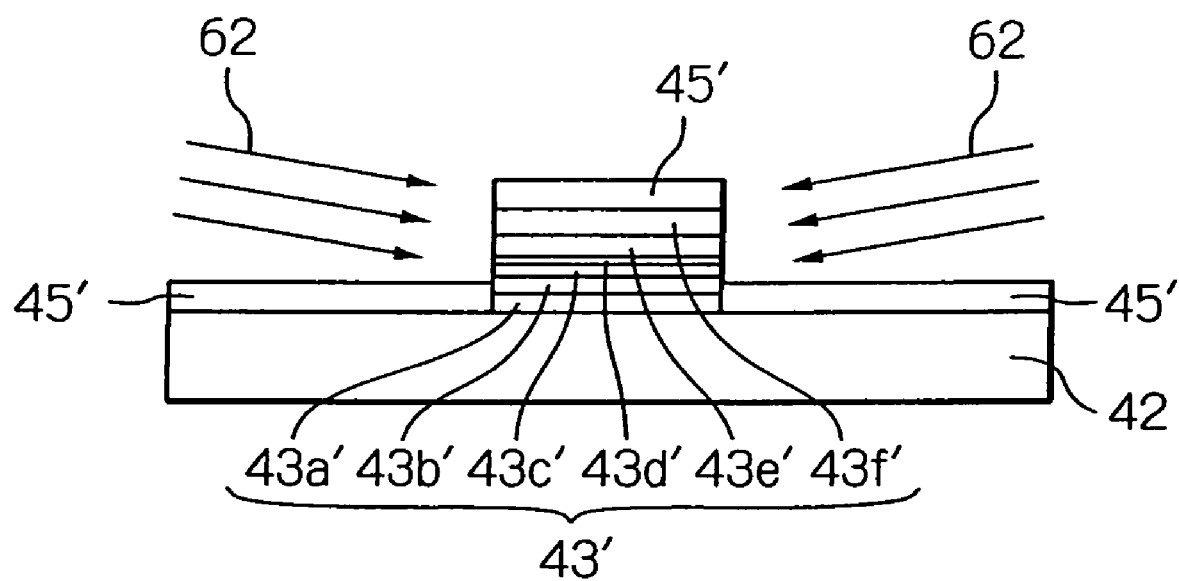
FIG. 11 shows a sectional view illustrating a process performed next to the process shown in FIG. 10d in a modification of the embodiment shown in FIGS. 10a to 10k.

FIG. 11 illustrates a modification of the wafer fabrication process shown in FIGS. 10a to 10k.

In this modification, a process shown in FIG. 11 for removing unnecessary film is additionally performed after the process shown in FIG. 10d for depositing the additional lower magnetic shield layer 45. Namely, in this additional process, the film 45' for the additional lower magnetic shield layer attached on side surfaces of the TMR multi-layered films 43', particularly on the side surfaces of the films 43' to short the free layer and the pinned layer via the film for the tunnel barrier layer (or spacer layer), is removed by a low angle milling using beam component 62 with an inclined angle of less than 45 degrees with respect to the surface of the substrate. Other processes in this modification are the same as the fabrication processes shown in FIGS. 10a to 10k.

In the aforementioned embodiments, the thin-film magnetic head has a TMR read head element. However, in modifications, a CPP-GMR read head element may be used instead of the TMR read head element. In the latter case, a spacer layer will be used instead of the tunnel barrier layer.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head, comprising:
a lower magnetic shield layer;
a magnetoresistive effect multi-layered structure formed on said lower magnetic shield layer so that current flows in a direction perpendicular to surfaces of laminated layers;
an upper magnetic shield layer formed on said magnetoresistive effect multi-layered structure;
an additional lower magnetic shield layer directly laminated on said lower magnetic shield layer outside both side ends in a track-width direction of said magnetoresistive effect multi-layered structure;
an insulation layer laminated directly on said additional lower magnetic shield layer and surfaces of both the side ends in a track-width direction of said magnetoresistive effect multi-layered structure; and
a magnetic bias layer laminated on said insulation layer, for controlling the magnetic domain of a magnetization-free layer of said magnetoresistive effect multi-layer structure,
said additional lower magnetic shield layer being directly contacted with the surfaces of both the side ends in a track-width direction of said magnetoresistive effect multi-layered structure, a top surface of said additional lower magnetic shield layer being positioned higher in height than a top surface of said lower magnetic shield layer in a region where said magnetoresistive effect multi-layered structure is formed,
said magnetoresistive effect multi-layered structure having a magnetization-fixed layer, a tunnel barrier layer or spacer layer laminated on said magnetization-fixed layer, and the magnetization-free layer laminated on said tunnel barrier layer or spacer layer, the top surface of said additional lower magnetic shield layer being positioned lower in height than a bottom surface of said magnetization-free layer of said magnetoresistive effect multi-layered structure.

2. The thin-film magnetic head as claimed in claim 1, wherein said additional lower magnetic shield layer is made of the same soft magnetic material as said lower magnetic shield layer.

3. The thin-film magnetic head as claimed in claim 1, wherein said additional lower magnetic shield layer is made of a soft magnetic material different from that of said lower magnetic shield layer.

4. The thin-film magnetic head as claimed in claim 1, wherein said magnetoresistive effect multi-layered structure is a tunnel magnetoresistive effect multi-layered structure or a current perpendicular to plane type giant magnetoresistive effect multi-layered structure.

* * * * *